United States Patent [19]

Messelhi

[11] Patent Number: 5,001,300
[45] Date of Patent: Mar. 19, 1991

[54] ENCAPSULATED CABLE SPLICE CLOSURE

[75] Inventor: Selim Messelhi, Etobicoke, Canada

[73] Assignee: Communications Technology Corporation, DAllas, Tex.

[21] Appl. No.: 527,675

[22] Filed: May 21, 1990

Related U.S. Application Data

[63] Continuation of Ser. No. 232,700, Aug. 16, 1988, abandoned.

[51] Int. Cl.$^5$ .................... H01R 4/22; H01R 13/514; H01R 13/52; H02G 15/113
[52] U.S. Cl. ........................................ 174/87; 174/76; 174/92; 174/138 F; 439/521; 439/731
[58] Field of Search ........................ 174/66, 76, 87, 92, 174/138 F; 220/3.8, 327; 439/199, 203, 204, 367, 519, 521, 687, 696, 731, 752, 892, 906, 936

[56] References Cited

U.S. PATENT DOCUMENTS

| | | | |
|---|---|---|---|
| 964,969 | 7/1910 | Hesterhagen | 174/92 X |
| 4,337,374 | 6/1982 | Smith | 174/138 F |
| 4,435,612 | 3/1984 | Smith | 174/92 |
| 4,610,738 | 9/1986 | Jervis | 174/76 X |

FOREIGN PATENT DOCUMENTS

883309  7/1953  Fed. Rep. of Germany ........ 174/66

*Primary Examiner*—Laramie E. Askin
*Attorney, Agent, or Firm*—Gerald G. Crutsinger; John F. Booth; Norman L. Gundel

[57] ABSTRACT

A closure for an electric cable splice includes first and second generally rectangular shell segments having side walls and end walls constructed and arranged to be telescopically secured together. A threaded fastener is connectable to extend through the first and second shell segments and is adapted to urge the shell segments together with sufficient force to extrude sealant in the first and second shell segments through entrance openings to encapsulate ends of spliced cables to provide a moistureproof seal between the spliced cables and the end wall adjacent the entrance openings.

20 Claims, 7 Drawing Sheets

ENCAPSULATED CABLE SPLICE CLOSURE

This is in continuation of application Ser. No. 07/232,700 filed Aug. 16, 1988, now abandoned.

FIELD OF THE INVENTION

This invention relates to an encapsulated cable splice closure suitable for burying in the ground for protecting a splice from moisture.

BACKGROUND OF THE INVENTION

Telephone and other electrical cables are interconnected by joining or splicing individual conductors of two or more cables. Since the integrity of each cable is breached at the end exposing the conductors for the splice, it is desirable to provide some type of electrical insulation and mechanical protection for the splice and cable ends. This is particularly so where the cables are buried underground and the splice will be buried after completion.

The service wire splice enclosure disclosed in U.S. Pat. No. 4,337,374 and Canadian Pat. No. 1,157,137 offers significant improvement over devices earlier developed. The enclosure is suitable for burial in the qround and provide moistureproofing and mechanical protection for the splice. A pair of shells which slide together, form a box-like enclosure having a plurality of internal compartments containing a quantity of sealant so that when the two sections are brought together with the cable splice therebetween, the splice components are completely surrounded by the sealant to provide waterproofing. The disclosure of U.S. Pat. No. 4,337,374 is incorporated herein by reference in its entirety, for all purposes.

A service wire splice enclosure of the type disclosed in U.S. Pat. No. 4,337,374 is commercially available from Communications Technology Corporation of Dallas, Tex. and is distributed as closure Part No. C8810 under its registered trademark "KLIK-IT."

A body of sealant is provided in separate shells of the "KLIK-IT" closure such that when the shells are forced together around the cable splice, the sealant forms a moistureproof barrier around the splice. As the shells are pushed together, wedge-shaped bosses on one of the shells snap into openings formed in the other shell for securing the shells together. The closure is extremely effective for protecting two pair and four pair cable splices.

Telephone cables generally incorporate from 2 to 1000 pairs of conductors. The average cable has about 400 pairs, while many service cables have 6 to 25 pairs of conductors. Heretofore, attempts to use enclosures of the type disclosed in U.S. Pat. No. 4,337,374 to accommodate spliced telephone cables from six pairs of twenty-four gauge conductors to twenty-five pair of twenty-two gauge conductors have not been effective in protecting the splices from damage from impact and from moisture ingress because of the size of the splice and accompanyinq problems encountered.

Splice closures theretofore developed for six to twenty-five pair cables are generally of either plastic or metal construction with which on-site mixed and poured encapsulation compound is used. This method is both crafts sensitive and time consuming.

Another method commonly used for protection of six to twenty-five pair cables utilizes shrink wrap which is shrunk over the splice using an open flame torch. This method is time consuming, craft sensitive, and expensive. Some feel that it creates a safety hazard because has tanks are required to produce the open flame.

SUMMARY OF THE INVENTION

A primary object of the invention is to provide a closure, for example from six pair to a twenty-five pair cable splice, which offers the advantages of the ready-to-use enclosure disclosed in Pat. No. 4,337,374. The closure generally includes a pair of shell segments positionable in juxtaposed relation to from a main compartment containing a flowable sealant for encapsulating a cable splice. The closure is provided with incorporatinq a mechanism capable of exerting sufficient force for urging the shell segments together to extrude the sealant through an opening from the main compartment, through which cable segments extend, to provide a moistureproof seal around the electrical conductors, while blocking flow of water into the closure through all entrance passages formed in the closure.

Upper and lower generally rectangular shell segments are formed such that one of the shell segments slides over the other shell segment. A hollow tubular conduit having an internally threaded central passage is formed on one of the shell segments and is telescopically received into a central opening in a guide sleeve formed on the other shell segment. A threaded fastener is positionable through the conduit and the guide sleeve to urge the shell segments together, when the threaded fastener is torqued, for applying sufficient force for encapsulating the splice in the sealant material and closing all avenues of ingress into the closure. The conduit and guide sleeve are arranged to protect conductors from damage by contact by the fastener during assembly. Each of the shell segments is shaped and configured to facilitate assembly by a technician in the field while providing sufficient structural rigidity to withstand forces required for torquing the threaded fastner for urging the shell segments together and to withstand rough handling generally associated with back filling ditches in which cables are buried.

BRIEF DESCRIPTION OF THE DRAWINGS

Drawings of a preferred embodiment of the invention are annexed hereto, so that the invention may be better and more fully understood, in which.

DETAILED DESCRIPTION OF A PREFERRED EMBODIMENT

Figure 1:
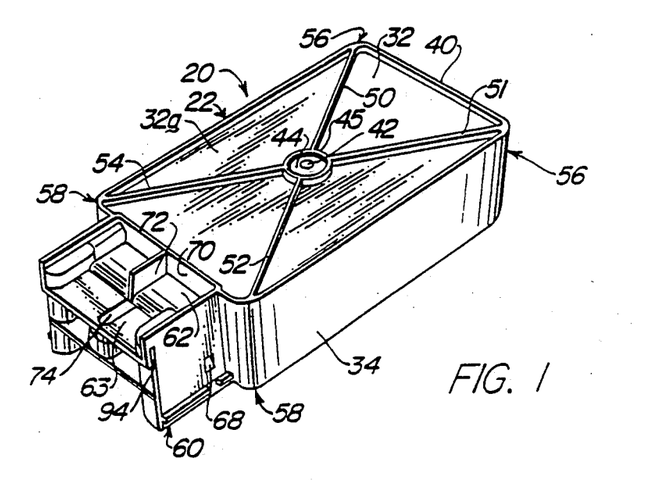
FIG. 1 is a perspective view of a closure for a cable splice illustrating the front, right side and top thereof.
Figure 2:
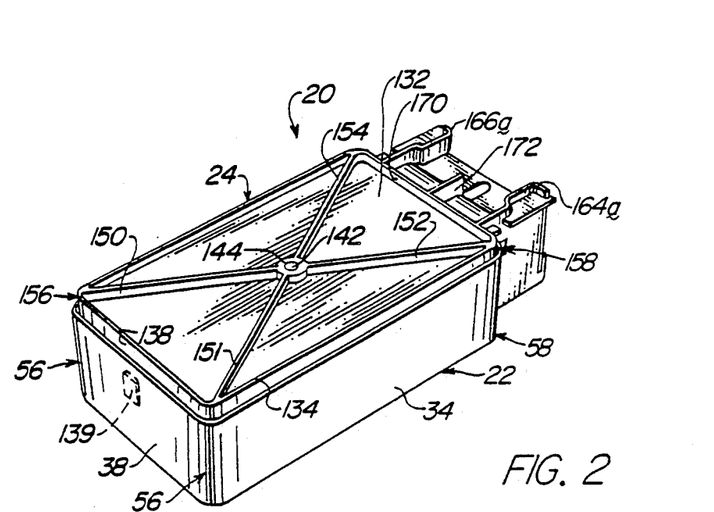
FIG. 2 is a perspective view thereof illustrating the rear, right side and bottom thereof.
Figure 3:
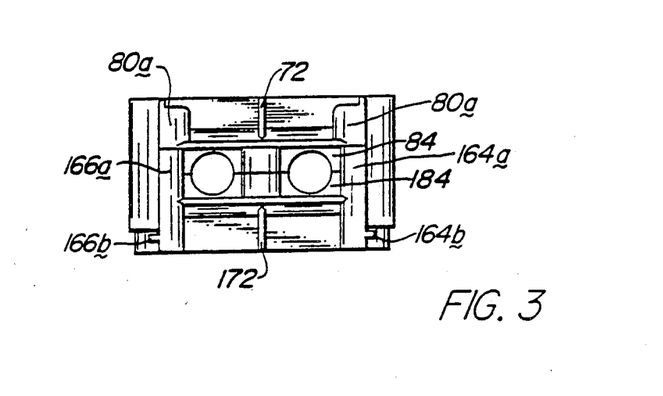
FIG 3 is a front elevational view thereof.
Figure 12:
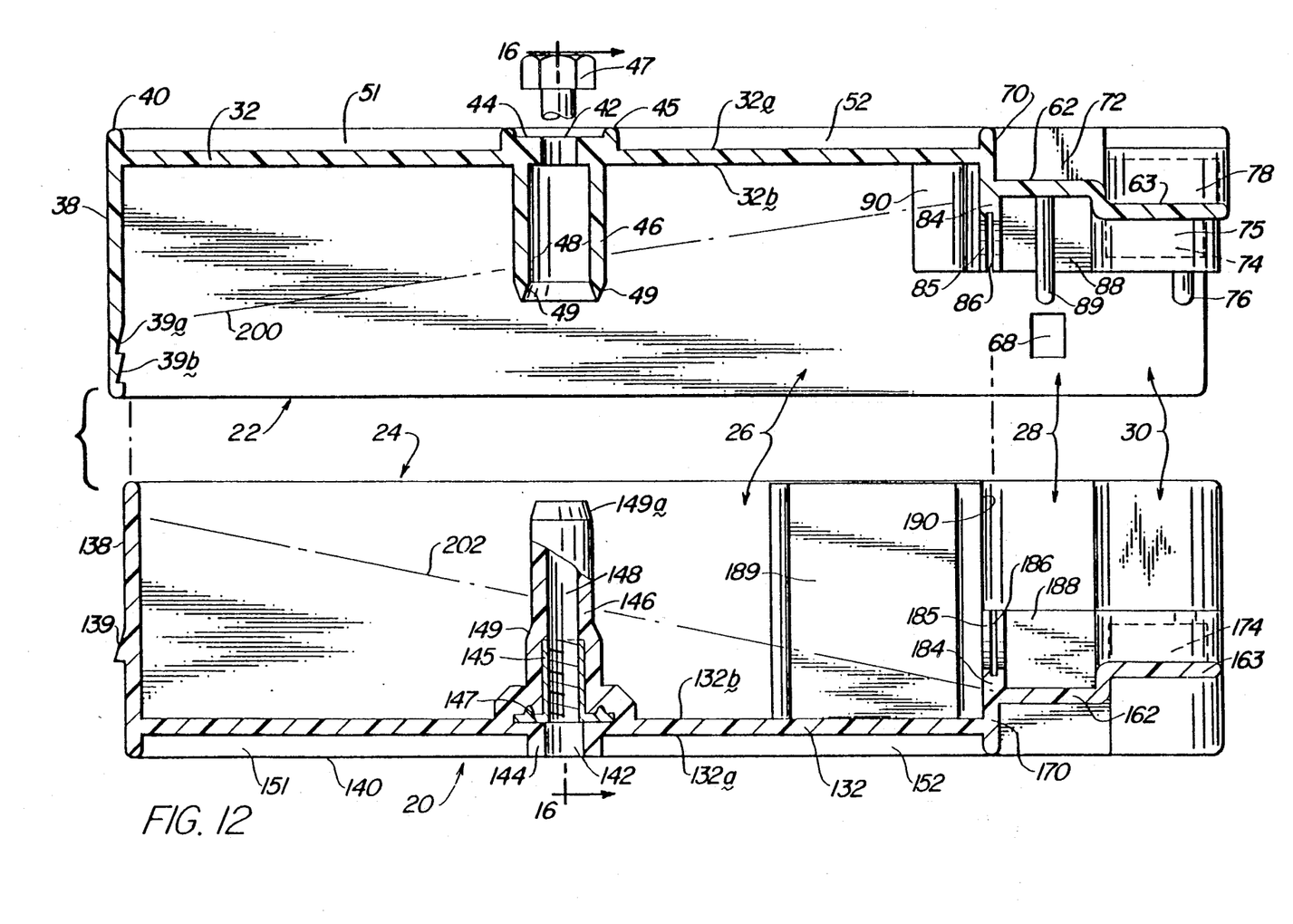
FIG. 12 is a cross-sectional view taken along line 12—12 of FIGS. 4 and 8.
Figure 13:
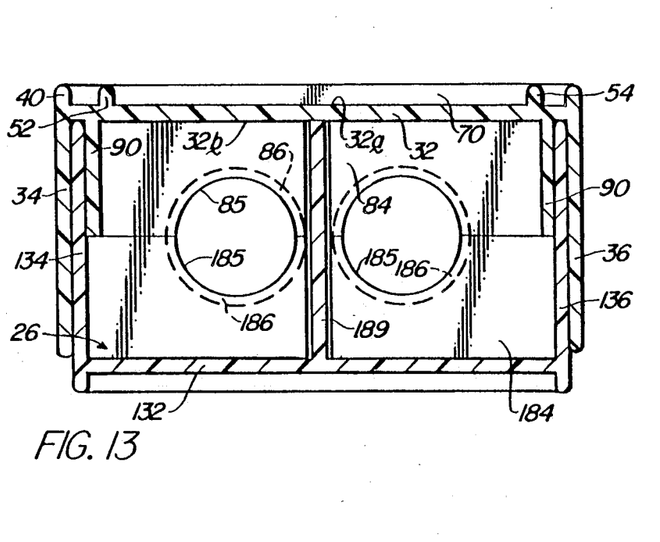
FIG. 13 is a cross-sectional view taken along line 13—13 of FIGS. 4 and 8.
Figure 14:
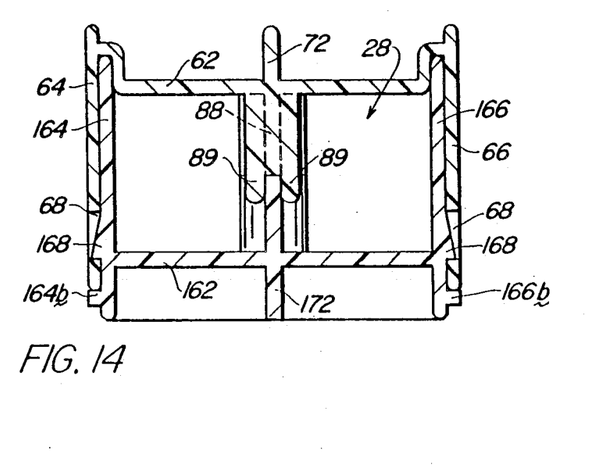
FIG. 14 is a cross-sectional view taken along line 14—14 of FIGS. 4 and 8.

Referring to FIGS 1, 2 and 12 of the drawings, the numeral 20 generally designates a closure for an electric cable splice. The closure 20 comprises first and second shell segments, an upper shell segment being generally designated by the numeral 22 and a lower shell segment being generally designated by the numeral 24, as illustrated in FIG. 2.

As will be hereinafter more fully explained and as best illustrated in FIG. 12, upper shell segment 22 slides over lower shell segment 24 to form a main compartment 26, an intermediate compartment 28 and an entrance section 30 in closure 20.

As best illustrated in FIGS. 1, 4, 5, 6 and 12 of the drawings, the upper shell segment 22 is of generally rectangular construction and comprises a top wall 32, spaced side walls 34 and 36 and a rear wall 38. Rear wall 38 has vertically spaced wedge-shaped recesses 39a and 39b formed therein as will be hereinafter more fully explained. Side walls 34 and 36 and rear wall 38 extend above top wall 32 to form a peripherally extending rib 40 which extends around three sides of the periphery of top wall 32.

Figure 4:
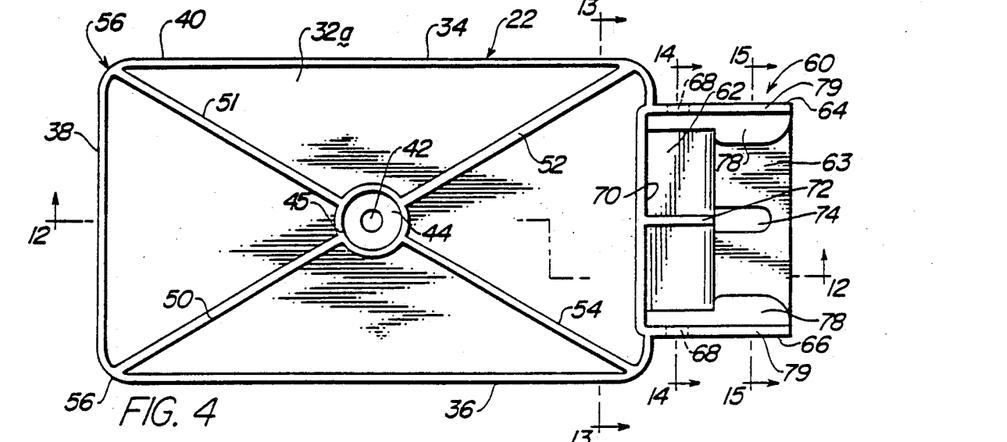
FIG. 4 is a top plan view of an upper segment shell.

A central opening 42 extends through top wall 32 and extends through a Central portion of a circular boss 44 having a circular rib 45 extending around the periphery thereof.

Figure 16:
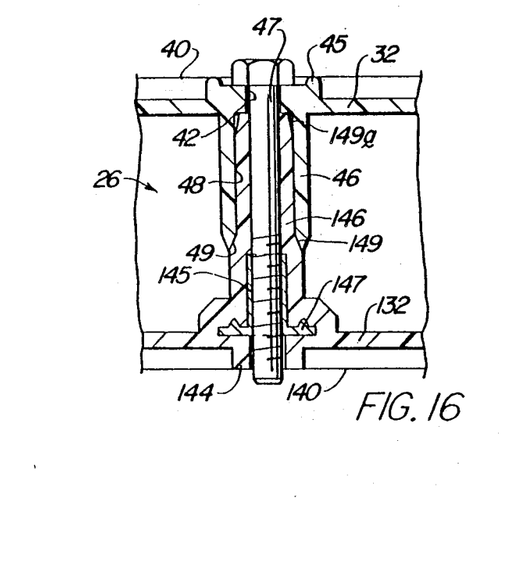
FIG. 16 is a cross-sectional view taken along line 16—16 of FIG. 12.

As best illustrated in FIGS.. 12 and 16, boss 44 extends upwardly from the upper surface 32a of top wall 32 and a hollow guide sleeve 46 extends downwardly from the lower surface 32b of top wall 32. Guide sleeve 46 has a central passage 48 communicating with the central opening 42 extending through top wall 32. The interior and exterior surfaces of the lower end of guide sleeve 46 are beveled to form an internal guide surface 49 around the lower end of passage 48 through guide sleeve 46.

As best illustrated in FIGS. 1 and 4 of the drawings, generally diagonally extending ribs 50, 51, 52 and 54 are formed on the upper surface 32a of top wall 32, each of the ribs having one end intersecting the peripherally extending rib 40 adjacent extremities of side walls 34 and 36 and another end intersecting the circular rib 45 extending around the periphery of boss 44 on top wall 32.

As illustrated in FIGS. 1, 2, 4 and 5, the corners of the upper shell segment 22 are curved and are formed by arcuate portions of side walls 34 and 36 which intersect with arcuate portions of rear wall 38 to form curved corners 56 adjacent opposite ends of rear wall 38. Similar curved corners 58 are formed adjacent the forward ends of side walls 34 and 36 to provide a transition section which intersects with and supports a neck generally designated by the numeral 60 adjacent the front end of the upper segment 22 of closure 20.

As best illustrated in FIGS. 1, 4 and 12 of the drawing, neck portion 60 of the closure is formed by a shaped upper wall comprising stepped top sections 62 and 63 extending between generally planer side walls 64 and 66 having opening 68 formed therein, as will be hereinafter more fully explained. A front wall 70 extends transversely between side walls 64 and 66 and is joined with top wall 32 to form an upwardly extending bead having an upper surface lying in the plane of the upper surface of bead 40. As best illustrated in FIG. 4 of the drawing, front wall 70 is offset slightly relative to curved corner portions 58 to telescopically receive portions of the lower shell segment 24.

Figure 10:
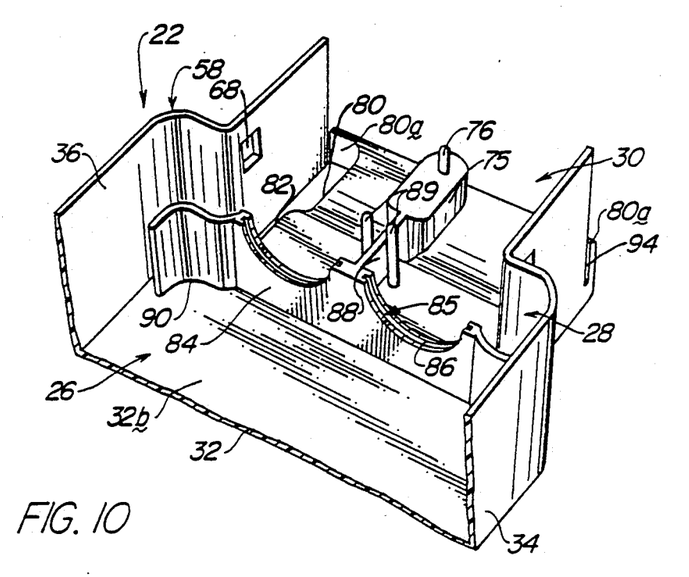
FIG. 10 is a fragmentary perspective view of the interior of the upper shell segment.
Figure 15:
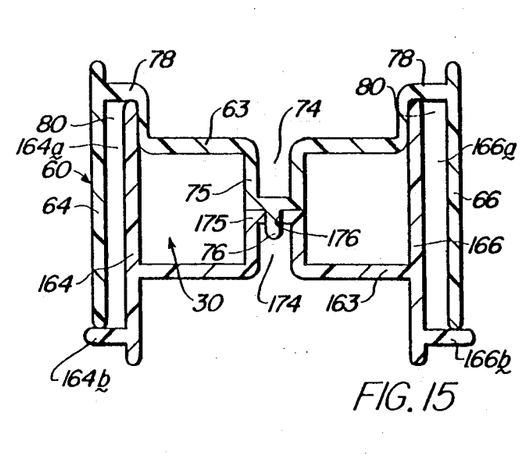
FIG. 15 is a cross-sectional view taken along line 15—15 of FIGS. 4 and 8.

A stiffener rib 72, best illustrated in FIGS. 1, 4, 12 and 14, extends upwardly from a central portion of section 62 of the top wall of neck 60 and is connected to a central portion of front wall 70 for stiffening section 62 of the to wall of neck 60. A central portion of section 63 of the top wall of neck 60 is deformed downwardly, as best illustrated in FIGS. 10, 12 and 15, to form a recess 74 on the exterior portion of section 63 of the top wall and to form a downwardly extending luq 75 inside neck 60. A guide pin 76 projects downwardly from lug 75.

End portions of sections 62 and 63 of the top wall of the neck portion 60 of the upper shell 22 of closure 20 are shaped to form an upwardly extending boss 78 and rib 79 adjacent the intersection with side walls 64 and 66 on the outside of neck 60 and a socket 80 and slot 82, illustrated in FIG. 10, on the inside of neck 60 as will be hereinafter more fully explained.

Figure 5:
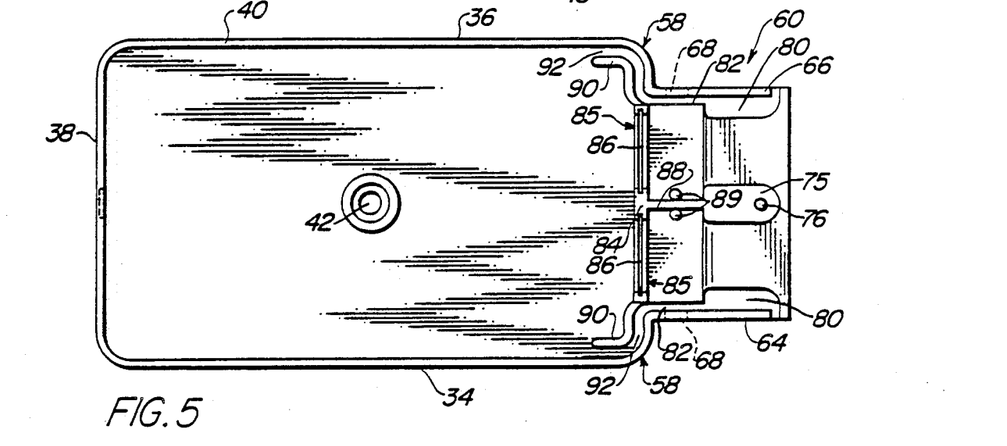
FIG. 5 is a bottom plan view of the upper shell segment.
Figure 6:
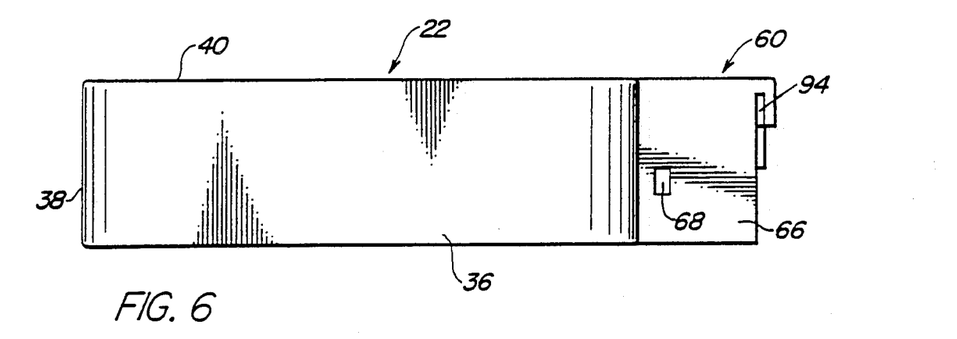
FIG. 6 is a riqht side elevational view of the upper shell segment, the left side elevational being a mirror image thereof.

Referring to FIGS. 5 and 12 of the drawings, front wall 70 extends below top wall 32 forming a baffle 84 having a pair of semicircular openings 85 formed therein. Each semicircular opening 85 has a groove 86 formed therein to receive a circular disk (not shown) to close one of the openings 85. A partition 88 extends between baffle 84 and lug 75, as illustrated in FIGS. 5, 10 and 12 of the drawings, and is provided with spaced guide posts 89 adjacent opposite sides thereof.

Generally S-shaped stabilizer wing portions 90 are formed on opposite ends of baffle 84. The stabilizer portions 90 are spaced from curved front portion 58 of side walls 34 and 36 forming a curved slot 92 therebetween. The curved S-shaped slot 92 intersects with slot 82 which communicates with socket 80.

All of the parts hereinbefore described of the upper shell segment 22 are preferably integrally formed, as by injection molding.

Figure 8:
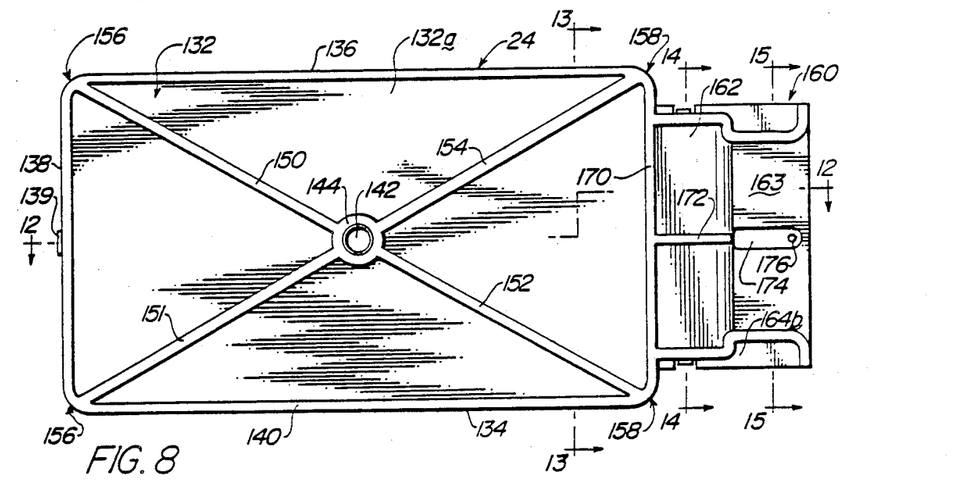
FIG. 8 is a bottom plan view of the lower shell segment.
Figure 9:
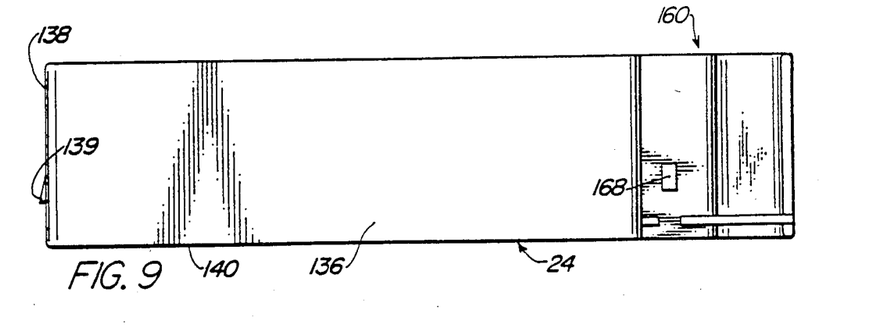
FIG. 9 is a riqht side elevational view of the lower shell segment.

As best illustrated in FIGS. 2 and 8 of the drawinqs, the lower shell segment 24 is of generally rectangular construction and comprises a bottom wall 132, spaced side walls 134 and 136 and a rear wall 138. Rear wall 138 has a wedge-shaped boss 139 formed thereon as will be hereinafter more fully explained. Side walls 134 and 136 and rear wall 138 extend below bottom wall 132 to form a rib 140 which extends around three sides of the periphery of bottom wall 132.

A central opening 142 extends through bottom wall 132 and extends through a central portion of a circular boss 144.

As best illustrated in FIGS. 12 and 16, boss 144 extends downwardly from the lower surface 132a of bottom wall 132 and a hollow tubular conduit 146 extends upwardly from the upper surface 132b of bottom wall 132. Tubular conduit 146 has a central passage 148 communicating with the central opening 142 extending through bottom wall 132. The interior and exterior surfaces of the upper end of conduit 146 are beveled to form a guide surface 149a around the upper end of passage 148 to facilitate inserting conduit 146 into the end of guide sleeve 46 on the upper segment 22. A surface 149 is formed intermediate opposite ends of conduit 146 and mates with surface 49 on guide sleeve 46.

As best illustrated in FIG. 12 of the drawing, an internally threaded anchor 145 having an annular flange 147 is embedded in the lower portion of conduit 146 and has a central passage aligned with opening 142 and passage 148 to receive the externally threaded end of a bolt 47. When bolt 47 is positioned through opening 42 in the upper segment 22 and threadedly engages anchor member 145 substantial force can be exerted urging the upper shell segment 22 downwardly over the lower shell segment 24 urging the lower surface of sealant 200 in the upper shell segment 22 into engagement with the upper surface 202 of sealant in the lower shell segment 24 causing the sealant to flow for filling the main compartment 26 and causing the sealant to be extruded through semi-circular openings 85 and 185 through the intermediate compartment 28 into the entrance section 30.

As best illustrated in FIGS. 2 and 8 of the drawings, generally diagonally extending ribs 150, 151, 152 and 154 are formed on the lower surface 132a of bottom wall 132, each of the ribs having one end intersecting the peripherally extending rib 140 adjacent extremities of side walls 134 and 136 and another end intersecting the circular boss 144 on the lower surface 132a of bottom wall 132.

Figure 7:
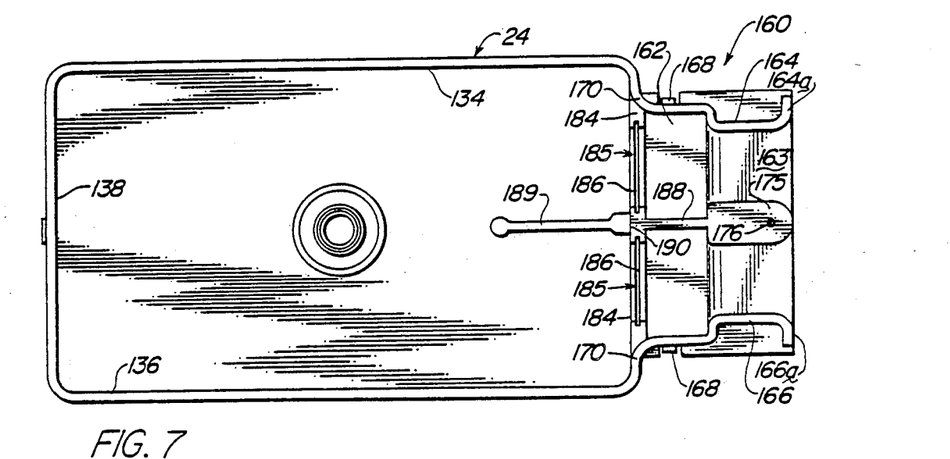
FIG. 7 is a top plan view of a lower shell segment.

As illustrated in FIGS. 2, 7 and 8, the corners of the lower shell segment 24 are curved and are formed by arcuate portions of side walls 134 and 136 which intersect with arcuate portions of rear wall 138 to form curved corners 156 adjacent opposite ends of rear wall 138. Similar curved corners 158 are formed adjacent the forward ends of side walls 134 and 136 to provide a transition section which intersects with and supports neck portion 160 adjacent the front end of the lower segment 24 of closure 20.

As best illustrated in FIGS. 2, 7, 8 and 12 of the drawings, neck portion 160 of the closure is formed by a shaped bottom wall comprising stepped top sections 162 and 163 extending between shaped side walls 164 and 166 having a boss 168 formed thereon, positioned to snap into openings 68 in upper segment 22. A front wall 170 extends transversely between side walls 164 and 166 and is joined with bottom wall 132 to form a downwardly extending bead having lower surface lying in the plane of bead 140. As best illustrated in FIG. 7 of the drawings, front wall 170 is generally tangent to curved portions 158 to be telescopically received in the S-shaped slots 92 in the upper segment 22.

A stiffener rib 172 extends downwardly from a central portion of section 162 of the bottom wall of neck 160 and is connected to a central portion of front wall 170 for stiffening section 162 of the bottom wall of neck 160.

Figure 11:
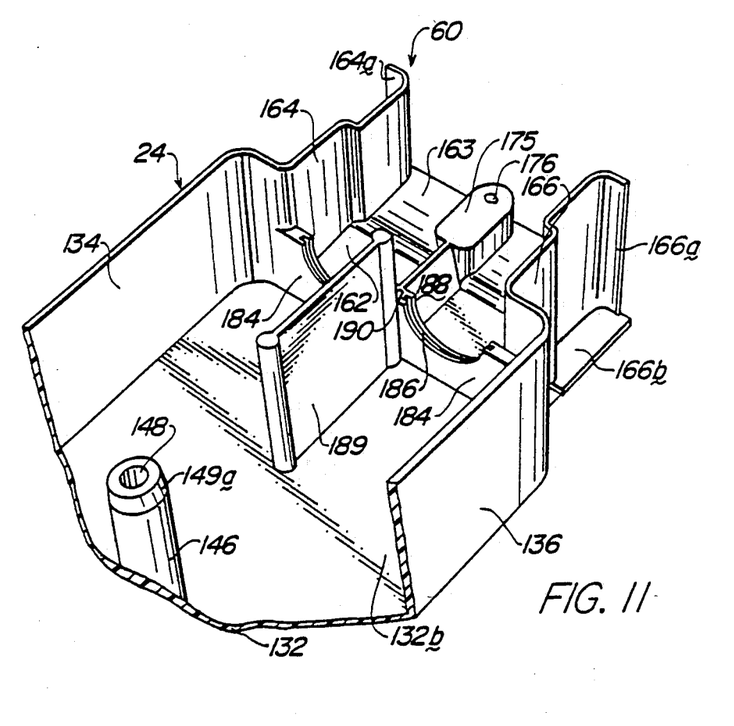
FIG. 11 is a fraqmentary perspective view of the interior of the lower shell segment.

A central portion of section 163 of the top wall of neck 160 is deformed upwardly as best illustrated in FIGS. 11 and 15 to form a recess 174 on the exterior portion of section 163 of the bottom wall and to form an upwardly extending lug 75 inside neck 160. An opening 176 is formed in lug 175 to receive guide pin 76 which projects downwardly from lug 75 on upper segment 22.

End portions of sections 162 and 163 of the bottom wall of the neck portion 160 of the lower segment 22 of closure 20 are flat and perpendicular to side walls 164 and 166.

Referring to FIGS. 7, 11 and 12 of the drawings, front wall 170 extends above bottom wall 132 forming a baffle 184 having semicircular openings 185 formed therein. Each semicircular opening 185 has a groove 186 formed therein. A first partition 188 extends between one side of the baffle 184 and lug 175 while a second partition 189 extends from baffle 184 toward rear wall 138. Partition 189 extends from bottom wall 132 approximately the same distance as side walls 134 and 136 and is generally parallel thereto A guide surface 190 on partition 189, adjacent the central portion of baffle 184, engages the rear surface of baffle 84 on upper segment 22 to align baffle 84 with baffle 184 on lower segment 24.

Curved corners 158 on lower segment 24 extend in front of generally S-shaped stabilizer wing portions 90 formed on opposite ends of baffle 84 while guide surface 190 on partition 189 engages the rear surface of baffle 84.

All of the parts hereinbefore described of the lower shell segment 24 are preferably integrally formed as by injection molding.

As hereinbefore explained, when bolt 47 is positioned through opening 42 in the upper segment 22 and threadedly engages anchor member 145, substantial force can be exerted urging the upper shell segment 22 downwardly over the lower shell segment 24.

As the rear wall 38 of the upper segment 22 moves downwardly relative to the rear wall 138 of lower segment 24, wedge-shaped boss 139 initially cams the lower portion of rear wall 38 outwardly. Further movement of rear wall 38 downwardly moves wedge-shaped boss 139 into wedge-shaped recess 39b or 39a securing rear wall 38 relative to rear wall 138.

It should also be apparent that screwing bolt 47 into anchor 145 moves bosses 168 on lower shell segment 24 into the openings 68 formed in side walls 64 and 66 of the neck portion. Thus, bosses 139 and 168 on lower shell segment 24 engage three surfaces on upper shell segment 22 for securing the shell segments together adjacent opposite ends of closure 20 to limit movement of shell segment 22 away from shell segment 24.

Further, as illustrated in FIG. 16, surface 49 on guide sleeve 46 is urged into engagement with surface 149 on conduit 146 as bolt 47 is screwed into internally threaded anchor 145. Thus, bolt 47 prevents movement of surface 49 away from surface 149, while the shoulder formed by surface 149 prevents further movement of guide sleeve 46 downwardly relative to conduit 146.

It should be readily apparent that the cooperative relationship of guide sleeve 46, bolt 47 and conduit 146 not only pulls upper and lower shell segments 22 and 24 together but also forms a central load bearing post supporting bosses 44 and 144 which are secured to ends of ribs 50, 51, 52 and 54, as well as ribs 150, 151, 152 and 154. It should be readily apparent that peripherally extending rib 40, side walls 34 and 36 and rear wall 38 are connected to the diagonally extending ribs on top wall 32 and supported by the post formed by guide sleeve 46 and conduit 146 which are configured to provide a strong structure shaped to withstand substantial shock loading generally accompanying back filling ditches in which the closure may be buried.

Further, partition 189 is shaped and configured to engage a central portion of the front end of upper wall 32 and lower wall 132, providing structural rigidity to oppose vertically directed forces as illustrated in FIG. 12 of the drawing. Further, guide surface 190 on the front end of partition 189 engages the rear surface of baffle 84 for aligning semi-circular openings 85 with semi-circular openings 185 and positioning baffles 84 and 184 in a common plane for forming a partition wall between main compartment 26 and intermediate compartment 28.

It should be readily apparent that posts 89, as illustrated in FIG. 10 enqage opposite sides of stiffener rib 172 for maintaining stiffener ribs 72 and 172 in a common plane extending generally perpendicular to the plane of baffles 84 and 184.

As lugs 75 and 175 are urged together, pin 76 is moved through opening 176 to prevent lateral movement of luq 75 relative to lug 175.

The curved forward portions 164a and 166a of side walls 164 and 166, respectively, of neck portion 160 of lower segment 24 extend into and are captured in sockets 80 formed in upper shell segment 22. The curved front wall portion 80a of socket 80 has a portion lying in a plane generally perpendicular to the longitudinal axis of closure 20 to form slots 94 into which ends of curved portions 164a and 166a extend.

Ledges 164b and 166b extend outwardly from lower ends of curved end portions 164a and 166a, respectively, to engage the lower edges of side walls 64 and 66, as best illustrated in FIG, 15 of the drawing, to form a strong reinforced frame structure surrounding the entrance into entrance section 30 of closure 20.

Curved end portions 164a and 166a of the side walls of the neck portion of closure 20 are shaped and configured to withstand substantial forces tending to crush the structure which may be exerted when the closure 20 is buried in a ditch. However, the structure is configured to withstand substantial lateral force as might be exerted when a cable is pulled while the cable is being laid or as a result of shifting soil around the closure after it has been buried.

Closure 20 for an electric cable splice is partially filled with sealant. The generally rectangular upper shell segment 22 is provided with side and end walls constructed and arranged to telescopically receive side walls and end walls on the second lower shell segment 24. The threaded fastener 47 is connectable to the first and second shell segments, said fastener being adapted to urge said first and second shell segments together with sufficient force to extrude sealant to encapsulate ends of spliced cables (not shown) extending through entrance openings and to provide a moistureproof seal between the spliced cables and the end wall adjacent the entrance openings.

Entrance sections 30, as illustrated in FIG. 15 of the drawing, receive cable sections 220 and 225 which extend through intermediate compartment 28 and through ports formed by openings in the partition wall formed by baffles 84 and 184 into the main compartment 26 where the splice is made. A pair of cables and the splice are diagrammatically illustrated in FIG. 17 of the drawing.

Figure 17:
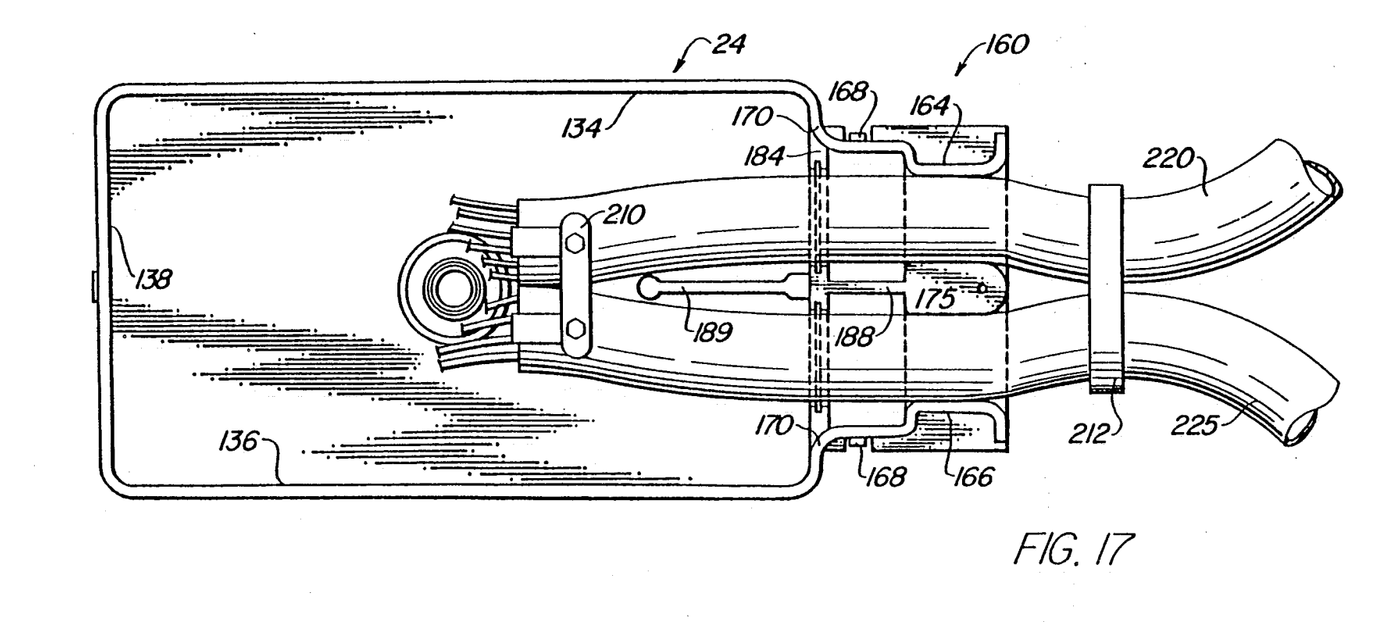
FIG. 17 is a diagrammatic view of a shell segment similar to FIG. 7 of the drawing illustrating the position of a pair of cables inserted into the shell segment.

A conventional bonding clip 210 secures ends of cables 220 and 225 inside the segments 22 and 24 adjacent the inner end of partition 189 while a second bonding clip 212 is employed for securing the cables 220 and 225 together outside of the enclosure. It should be greatly apparent that bonding clips 210 and 212 securing cables 220 and 225 together at two locations adjacent opposite ends of partition 189 and lug 175 minimizes the possibility of movement of segments 22 and 24 relative to cables 220 and 225 after the slice has been made.

A volume of sealant 200 and 202, as illustrated in FIG. 12 of the drawing, is selected to completely fill the main compartment 26 when the smallest size of cable 220 and 225 is employed to assure that tightening of bolt 47 urging segments 22 and 24 together will apply sufficient pressure to the surface of sealant 200 and 202 to supply sufficient pressure for completely filling main compartment 26, forcing sealant through ports 85 into the intermediate section 28 to prevent ingress of moisture into the closure.

Ports 85 are sized to accommodate the largest cable 220 or 225 which may be employed with the enclosure.

From the foregoing, it should be readily apparent that the enclosure filled with a flexible encapsulant sealant 200, 202 prevents ingress of moisture into the closure. Removal of bolt 47 causes the enclosure to be reenterable without damage to cables or splice for repair or inspection.

What I claim is:

1. A closure for an electric cable splice, comprising: first and second shell segments, continuous ribs extending around the periphery of said first and second shell segments, said shell segments being configured such that one of said shell segments slides over and telescopically receives a portion of the other shell segment to form a main compartment, an intermediate compartment, and an entrance section having an entrance passage extending therethrough; a hollow tubular conduit having an end secured to said second shell segment, said first shell segment having a fastener receiving opening extending therethrough; a boss extending around said fastener receiving opening; transversely extending ribs formed on said first shell segment, each of said transversely extending ribs having ends secured to said continuous rib extending around the periphery of said first shell segment and to said boss adjacent said fastener receiving opening, a guide sleeve constructed and arranged to telescopically receive said conduit and having an end secured to said first shell segment, said fastener receiving opening in said first shell segment communicating with the interior of said guide sleeve; metallic anchor means in said conduit; and fastener means positionable through said fastener receiving opening in said first shell segment and engageable with said metallic anchor means in said hollow tubular conduit secured to said second shell segment for telescopically securing one of said shell segments in the other shell segment, said transversely extending ribs being constructed and arranged to distribute force exerted by said fastener means to said continuous rib extending around the periphery of said first shell segment.

2. A closure for an electric cable splice according to claim 1, with addition of a beveled surface on the interior of said guide sleeve for guiding an end of said conduit into said guide sleeve.

3. A closure for an electric cable splice according to claim 1, said conduit having beveled exterior surfaces on an end of said conduit to guide an end of said conduit into said guide sleeve.

4. A closure for an electric cable splice according to claim 1 wherein said fastener means comprises a bolt extending through said guide sleeve and through said conduit for securing said shell segments together.

5. An assembly formed by a pair of spliced cable segments and a splice enclosure comprising: first and second generally rectangular shell segments, side and end walls on said first and second shell segments, said side walls and end walls on said first shell segment being constructed and arranged to telescopically receive said side walls and end walls on said second shell segment, an end wall of each of said first and second shell segments having an entrance passage formed therethrough, cable segments having ends extending through said entrance passage; means joining said ends of said cable segments to form a splice; anchor means secured to said shell segment; and fastener means connectable to said first shell segment, said fastener means being adapted to engage said anchor means to urge said first and second shell segments together, said fastener means and said anchor means being configured to form a central load bearing post to limit relative movement of said shell segments.

6. An assembly according to claim 5 with the addition of stiffener ribs on each of said shell segments, said stiffener ribs being constructed and arranged to transfer force exerted by said fastener means to portions of said shell segments adjacent said side walls and said end walls.

7. An enclosure for a cable splice, comprising a first generally rectangular shell segment having a main section, an intermediate section and an entrance sec-tion; a second generally rectangular shell segment having a main section, an intermediate section and an entrance section one of said shell segments sliding over the other of said shell segments bringing said main sections together to form a main compartment, said intermediate sections together to form an intermediate compartment, and said entrance sections to-gether to form an entrance passage; a body of sealant in the main section of at least one of said shell segments; and fastener means extending through the main section of each of said shell segments, said fastener means being arranged to controllably urge said first and second shell segments together to extrude sealant material from said main compartment into said intermediate compartment to form a moisture barrier between said entrance passage and said main compartment.

8. A enclosure as defined in claim 7 including a body of sealant in said main section of of each shell segment.

9. An enclosure as defined in claim 8 with at least one of said shell segments having a barrier member between the main and intermediate sections thereof, with a slot in said barrier member for receiving spliced cables with said slot providing a passage of reduced size between said main and intermediate sections.

10. An enclosure as defined in claim 9 with said shell segments having inter-engaging elements for holding said shell segments together.

11. An enclosure as defined in claim 10 wherein said inter-engaging elements include a first opening in a wall of one shell segment and a first boss on a wall of the other shell segment and positioned for entering said first opening when said shell segments are brought together.

12. An enclosure as defined in claim 10 wherein said inter-engaging elements include first and second spaced opening in walls of the other shell segment, said first and second bosses being positioned for entering said first and second openings when said shell segments are brought together.

13. An enclosure as defined in claim 10 wherein each of said entrance sections has opposed walls at the outer ends thereof diverging in continuous curves.

14. An enclosure as defined in claim 7 wherein said entrance passage is of a first cross-sectional area to receive a pair of cables, said intermediate compartment is of a second cross-sectional area larger than said first cross-sectional area, and said main compartment is of a third cross-sectional area larger than said second cross-sectional area, and with each of said shell segments having a barrier member between the main and intermediate sections thereof with a pair of openings therein, with said barrier members overlapping when said shell segments are brought together so that said openings define interior passages of substantially the same cross-sectional area as said first cross-sectional area of said entrance passage, and with said entrance passage and interior passages alignment.

15. An enclosure as defined in claim 14, said body of sealant in the main section of at least one of said shell segments, comprising: a body of sealant in the main section of said second shell segment.

16. An enclosure as defined in claim 15 with said shell segments having inter-engaging elements for holding said shell segments together.

17. An enclosure as defined in claim 16 wherein said inter-engaging elements include a first opening in a wall of one shell segment and a first boss on a wall of the other shell segment and positioned for entering said first opening when said shell segments are brought together.

18. An enclosure as defined in claim 14, said body of sealant in the main section of at least one of said shell segments comprising: a body of sealant in each of said shell segments, the amount of said sealant in said main sections being such that sealant is forced from said main compartment into said intermediate compartment when said shell segments are brought together.

19. An enclosure as defined in claim 18 wherein each of said entrance sections has opposed walls at the outer ends thereof diverging in continuous curves.

20. An enclosure for a cable splice, comprising: a first generally rectangular shell segment having a main section, an intermediate section and an entrance section; a second generally rectangular shell segment having a main section, an intermediate section and an entrance section one of said shell segments sliding over the other of said shell segments bringing said main sections together to form a main compartment, said intermediate sections together to form an intermediate compartment, and said entrance sections together to form an entrance passage, wherein said entrance passage is of a first cross-sectional area to receive a pair of cables, said intermediate compartment is of a second cross-sectional area larger than said first cross-sectional area, and said main compartment is of a third cross-sectional area larger than said second cross-sectional area, and with each of said shell segments having a barrier member between the main and intermediate sections thereof with a pair of openings therein, said barrier members overlapping when said shell segments are brought together so that said openings define interior passages of substantially the same cross-sectional area as said first cross-sectional area of said entrance passage, and with said entrance passage and interior passages in alignment; first and second vertically spaced wedge-shaped recesses in a wall of one shell segment and a wedge-shaped boss on the other shell segment, with said boss being positioned for entering said first wedge-shaped recess when said shell segments are brought together to a first stage and with said boss being positioned for entering said second wedge-shaped recess when said shell segments are brought together to a second stage for holding the segments together; a body of sealant in the main section of said second shell segment; and fastener means extending through the main section of each of said shell segments, said fastener means being arranged to controllably urge said first and second shell segments together to extrude sealant material from said main compartment into said intermediate compartment and said entrance passage to form a moisture barrier in said entrance passage.

* * * * *

UNITED STATES PATENT AND TRADEMARK OFFICE
CERTIFICATE OF CORRECTION

PATENT NO. : 5,001,300
DATED      : March 19, 1991
INVENTOR(S) : Selim Messelhi

It is certified that error appears in the above-identified patent and that said Letters Patent is hereby corrected as shown below:

Column 2, line 3, change "has" to read -- gas --;

Column 2, line 7, delete "from" and in lieu thereof insert -- for a --;

Column 2, line 13, delete "incorporatinq";

Column 7, line 16, change "luq" to read -- lug --;

Column 9, line 62, after "of" insert -- one shell segment and first and second spaced bosses on walls of --.

Signed and Sealed this

Twentieth Day of October, 1992

Attest:

DOUGLAS B. COMER

Attesting Officer

Acting Commissioner of Patents and Trademarks